(12) United States Patent
Wang et al.

(10) Patent No.: US 10,782,185 B2
(45) Date of Patent: Sep. 22, 2020

(54) LIGHT SENSOR AND TERMINAL DEVICE

(71) Applicant: Huawei Technologies Co., Ltd., Shenzhen (CN)

(72) Inventors: Hui Wang, Hangzhou (CN); Wenxiong Wei, Hangzhou (CN); Gaopeng Qu, Hangzhou (CN); Wei Guo, Shenzhen (CN)

(73) Assignee: Huawei Technologies Co., Ltd., Shenzhen (CM)

(*) Notice: Subject to any disclaimer, the term of this patent is extended or adjusted under 35 U.S.C. 154(b) by 0 days.

(21) Appl. No.: 16/797,383

(22) Filed: Feb. 21, 2020

(65) Prior Publication Data

US 2020/0191648 A1 Jun. 18, 2020

Related U.S. Application Data

(63) Continuation of application No. PCT/CN2018/101582, filed on Aug. 21, 2018.

(30) Foreign Application Priority Data

Aug. 22, 2017 (CN) .......................... 2017 1 0732235
Nov. 7, 2017 (CN) .......................... 2017 1 1083552

(51) Int. Cl.
  *G01J 1/04* (2006.01)
  *G02B 5/30* (2006.01)
  *G01J 1/42* (2006.01)

(52) U.S. Cl.
  CPC ........... *G01J 1/0429* (2013.01); *G01J 1/0488* (2013.01); *G01J 1/4204* (2013.01); *G01J 1/4228* (2013.01); *G02B 5/3083* (2013.01)

(58) Field of Classification Search
  CPC ...... G01J 1/0429; G01J 1/0488; G01J 1/4204; G01J 1/4228
  USPC .......................................... 250/216, 225, 226
  See application file for complete search history.

(56) References Cited

U.S. PATENT DOCUMENTS

| 2003/0116695 A1 | 6/2003 | Masuda et al. |
| 2008/0006762 A1 | 1/2008 | Fadell et al. |
| 2013/0278147 A1 | 10/2013 | Vetsuypens et al. |
| 2015/0122978 A1 | 5/2015 | Dejong et al. |

(Continued)

FOREIGN PATENT DOCUMENTS

| CN | 101951445 A | 1/2011 |
| CN | 202135360 U | 2/2012 |

(Continued)

*Primary Examiner* — Kevin K Pyo
(74) *Attorney, Agent, or Firm* — Slater Matsil, LLP

(57) ABSTRACT

A light sensor is provided. The light sensor includes at least one light sensor submodule, and each light sensor submodule includes a first light detector, a second light detector, a first linear polarizer, a second linear polarizer, a first phase delay film, and a second phase delay film. The first light detector is configured to obtain light intensity of first hybrid light resulting when hybrid light has passed through the first phase delay film and the first linear polarizer, and the second light detector is configured to obtain light intensity of second hybrid light resulting when the hybrid light has passed through the second phase delay film and the second linear polarizer, the hybrid light includes first light and second light, and after the hybrid light passes through the second linear polarizer, the first light is filtered out.

20 Claims, 5 Drawing Sheets

(56) References Cited

U.S. PATENT DOCUMENTS

2018/0274974 A1 9/2018 Wang
2020/0072673 A1* 3/2020 Sassone ................ G01J 1/4228

FOREIGN PATENT DOCUMENTS

CN 204155595 U 2/2015
CN 106462339 A 2/2017

* cited by examiner

LIGHT SENSOR AND TERMINAL DEVICE

CROSS-REFERENCE TO RELATED APPLICATIONS

This application is a continuation of International Application No. PCT/CN2018/101582, filed on Aug. 21, 2018, which claims priority to Chinese Patent Application No. 201710732235.3, filed on Aug. 22, 2017 and Chinese Patent Application No. 201711083552.3, filed on Nov. 7, 2017. The disclosures of the aforementioned applications are hereby incorporated by reference in their entireties.

TECHNICAL FIELD

This application relates to the light sensor field, and in particular, to a light sensor and a terminal device.

BACKGROUND

To make adjustment of screen brightness adaptive to ambient light intensity, current mobile phones and wearable devices need to be equipped with an ambient light sensor to implement light detection. As requirements for simple structures, good appearances, and the like are imposed, it is necessary to place a light sensor behind a screen to achieve a full-screen display effect. In other words, the ambient light sensor not only receives natural ambient light penetrating through a display screen, for example, an OLED screen, but also receives non-ambient light emitted by the display screen itself, for example, unpolarized lamplight. The non-ambient light, together with the ambient light penetrating through the display screen, is received by the light sensor behind, causing light detection interference. As a result, the ambient light cannot be accurately detected.

SUMMARY

Embodiments of this application provide a light sensor to resolve the prior-art problem that ambient light cannot be accurately detected due to light detection interference.

According to a first aspect, this application provides a light sensor, where the light sensor includes at least one light sensor submodule, and each light sensor submodule includes a first light detector, a second light detector, a first linear polarizer, a second linear polarizer, a first phase delay film, and a second phase delay film, where the first light detector and the second light detector are disposed adjacently to each other; the first linear polarizer is located above the first light detector; the second linear polarizer is located above the second light detector; the first phase delay film is located above the first linear polarizer; and the second phase delay film is located above the second linear polarizer. The first light detector is configured to obtain light intensity of first hybrid light resulting when hybrid light has passed through the first phase delay film and the first linear polarizer, and the second light detector is configured to obtain light intensity of second hybrid light resulting when the hybrid light has passed through the second phase delay film and the second linear polarizer, where the hybrid light includes first light and second light, and after the hybrid light passes through the second linear polarizer, the first light is filtered out. Therefore, a difference between the light intensity of the first hybrid light and the light intensity of the second hybrid light is light intensity of light resulting when the first light has passed through the first phase delay film and the first linear polarizer. The light sensor can filter out light other than natural ambient light to avoid that a detection result is inaccurate due to detection interference. The first phase delay film and the second phase delay film may perform conversion for the first light that is circularly polarized light. For the sake of stability, the first light detector and the second light detector may be connected to each other. To reduce a package volume of the light sensor and ensure light sensing accuracy of the light sensor, the first linear polarizer and the second linear polarizer are located at one level.

The first phase delay film and the second phase delay film are formed in one piece or formed separately. If the first light detector and the second light detector have a same vertical height, the first phase delay film and the second phase delay film may be a complete film covering the first light detector and the second light detector. If there is a height difference between the first light detector and the second light detector, the first phase delay film and the second phase delay film can be separately disposed. In this way, assembly of the first phase delay film, the second phase delay film, the first light detector, and the second light detector is more flexible. In addition, the first phase delay film and the second phase delay film formed in one piece can reduce processing procedures.

The first light is circularly polarized light resulting when ambient light has passed through a display screen disposed with a circular polarizer, and the second light is light emitted by the display itself (for example, light emitted by a self-luminous pixel or light emitted by a backlight). A light detector can be used to detect influence acted by ambient light outside the display screen on brightness of the display screen. It should be explained that, in this application, a "circular polarizer" means a component capable of converting unpolarized light into circularly polarized light, but how it is specifically implemented is not limited. For example, a circular polarizer may be constructed using a plurality of discrete components (for example, phase delay films and linear polarizers), or using a separate component (for example, a component packaged with phase delay films and linear polarizers, or a component achieving this function with another structure designed).

A polarization direction of the first linear polarizer is the same as a polarization direction of the first light that has not passed through the first linear polarizer, and a polarization direction of the first light is orthogonal to a polarization direction of the second linear polarizer. This can generate a difference between the light intensity detected by the first light detectors and the light intensity detected by the second light detector. Then the actual light intensity to be detected can be obtained by using the light intensity difference.

The first light is circularly polarized light. After passing through the first phase delay film, the first light is converted into first linearly polarized light whose polarization direction is the same as a polarization direction of the first linear polarizing film. After passing through the second phase delay film, the first light is converted into second linearly polarized light whose polarization direction is orthogonal to a polarization direction of the second linear polarizer, so that the second linearly polarized light is filtered out when passing through the second linear polarizer. The second light is unpolarized light. After passing through the first phase delay film, the second light passes through the first linear polarizing film to become third linearly polarized light. After passing through the second phase delay film, the second light passes through the second linear polarizing film to become fourth linearly polarized light. The first hybrid light includes the first linearly polarized light and the third linearly polarized light, and the second hybrid light includes the fourth linearly polarized light, where light intensity of the third linearly polarized light is the same as light intensity of the fourth linearly polarized light. Therefore, the difference between the light intensity of the first hybrid light and the light intensity of the second hybrid light is light intensity of the first linearly polarized light resulting when the hybrid light has passed through the first phase delay film and the first linear polarizer. Then the light sensor can accurately detect light intensity of the first light that enters the light sensor, with influence of the second light on detection avoided.

The light sensor further includes a processor, where the processor is configured to: obtain total intensity of the first light and the second light that is detected by the first light detector, and light intensity, detected by the second light detector, of the second light, and output a difference between the light intensity detected by the first light detector and the light intensity detected by the second light detector. Calculation of a light sensing value is implemented by using the processor, so as to obtain the light intensity to be detected. The processor is disposed inside the first light detector or the second light detector, or on a circuit board accommodated in the light sensor without a specific position limited provided that a design fits actual space inside the light sensor. Certainly, it may alternatively be disposed outside the light sensor, for example, inside a processor of the terminal.

There are a plurality of light sensor submodules that are arranged in a form of a matrix, and in the matrix formed by the plurality of light sensor submodules, first light detectors and second light detectors are arranged in a staggered manner. Light intensity detected by the light sensor is a sum of light intensity values detected by the plurality of light sensor submodules. A quantity of the light sensor submodules and their arrangement are designed based on actual requirements to achieve a better detection result.

This application provides a light sensor, including at least one light sensor submodule. Each light sensor submodule includes: a first light detector, and a second light detector disposed adjacently to the first light detector; a first linear polarizer, located above the first light detector; and a second linear polarizer, located above the second light detector. The first light detector is configured to obtain light intensity of first hybrid light resulting when hybrid light has passed through the first linear polarizer, and the second light detector is configured to obtain light intensity of second hybrid light resulting when the hybrid light has passed through the second linear polarizer. The hybrid light includes first light and second light. The first light is linearly polarized light, and the second light is unpolarized light. The polarization direction of the first light is the same as that of the first linear polarizer and is orthogonal to that of the second linear polarizer. The first light is filtered out by the second linear polarizer, and the second light is converted into linearly polarized light after passing through the first linear polarizer and the second linear polarizer. Therefore, a difference between the light intensity of the first hybrid light and the light intensity of the second hybrid light is light intensity of the first light that has passed through the first linear polarizer. The light sensor in this embodiment of this application can directly detect light intensity of linearly polarized light that enters the light sensor.

According to a second aspect, this application discloses a light sensor. The light sensor includes at least one light sensor submodule, where each light sensor submodule in this application includes a first light detector, a second light detector, a first linear polarizer, a second linear polarizer, a first phase delay film, and a second phase delay film, where the first light detector in this application and the second light detector in this application are disposed adjacently to each other; the first linear polarizer in this application is located above the first light detector in this application; the second linear polarizer in this application is located above the second light detector in this application; the first phase delay film in this application is located above the first linear polarizer in this application; the second phase delay film in this application is located above the second linear polarizer in this application; and the first light detector in this application is configured to obtain light intensity of first hybrid light resulting when hybrid light has passed through the first phase delay film in this application and the first linear polarizer in this application, and the second light detector in this application is configured to obtain light intensity of second hybrid light resulting when the hybrid light in this application has passed through the second phase delay film in this application and the second linear polarizer in this application, where the hybrid light in this application includes first light and second light, and after the hybrid light in this application passes through the second linear polarizer in this application, the first light in this application is filtered out, so that a difference between the light intensity of the first hybrid light in this application and the light intensity of the second hybrid light in this application is light intensity of light resulting when the first light in this application has passed through the first phase delay film in this application and the first linear polarizer in this application.

In a first implementation of the second aspect, a fast axis direction of the first phase delay film is the same as a fast axis direction of the second phase delay film, or a slow axis direction of the first phase delay film is the same as a slow axis direction of the second phase delay film; and a polarization direction of the first linear polarizer is the same as a polarization direction of first linearly polarized light resulting when the first light has passed through the first phase delay film, and a polarization direction of the first light is orthogonal to a polarization direction of the second polarizer.

In a second implementation of the second aspect, a fast axis direction of the first phase delay film is orthogonal to a fast axis direction of the second phase delay film, or a slow axis direction of the first phase delay film is orthogonal to a slow axis direction of the second phase delay film; and a polarization direction of the first linear polarizer is the same as a polarization direction of first polarized light resulting when the first light has passed through the first phase delay film, and a polarization direction of the first light is the same as a polarization direction of the second polarizer.

The purpose of filtering out the first light mentioned in the second aspect can be achieved by using either the first or the second implementation of the second aspect.

Based on the second aspect and the implementations of the second aspect, in a third implementation, the first light is circularly polarized light resulting when ambient light has passed through a display screen disposed with a circular polarizer.

The second light is light emitted by a light emitting component of the display screen. The light emitting component may be a self-luminous pixel (for example, a pixel of an OLED screen), or some backlight components, for example, a backlight module (for example, an LED) of an LCD screen, or other components for emitting light.

Based on the second aspect and the implementations of the second aspect, in a fourth implementation, the first phase delay film and the second phase delay film are formed in one piece or formed separately.

Based on the second aspect and the implementations of the second aspect, in a fifth implementation, the first phase delay film and the second phase delay film are both quarter-wave plates.

Based on the second aspect and the implementations of the second aspect, in a sixth implementation, there are a plurality of light sensor submodules that are arranged in a form of a matrix, and in the matrix formed by the plurality of light sensor submodules, first light detectors and second light detectors are arranged in a staggered manner.

Based on the second aspect and the implementations of the second aspect, in a seventh implementation, the light sensor further includes a processor, and the processor is configured to: obtain total intensity of the first light and the second light that is detected by the first light detector, and light intensity, detected by the second light detector, of the second light, and output a difference between the light intensity detected by the first light detector and the light intensity detected by the second light detector.

Based on the second aspect and the implementations of the second aspect, in an eighth implementation, the processor is disposed on one side or at the bottom of the first light detector or the second light detector, or is connected to the light sensor through a circuit board.

According to a third aspect, this application further discloses a light sensor. The light sensor includes at least one light sensor submodule, where each light sensor submodule includes a first light detector, a second light detector, a first linear polarizer, a second linear polarizer, a first phase delay film, and a second phase delay film, where the first light detector and the second light detector are disposed adjacently to each other; the first linear polarizer is located above the first light detector; the second linear polarizer is located above the second light detector; the first phase delay film is located above the first linear polarizer; the second phase delay film is located above the second linear polarizer; the first light detector is configured to obtain light intensity of first hybrid light resulting when hybrid light has passed through the first phase delay film and the first linear polarizer, and the second light detector is configured to obtain light intensity of second hybrid light resulting when the hybrid light has passed through the second phase delay film and the second linear polarizer; a fast axis direction of the first phase delay film is the same as a fast axis direction of the second phase delay film, or a slow axis direction of the first phase delay film is the same as a slow axis direction of the second phase delay film; and a polarization direction of the first linear polarizer is the same as a polarization direction of the first light that has passed through the first phase delay film, and a polarization direction of the first light is orthogonal to a polarization direction of the second polarizer.

According to a fourth aspect, this application further discloses a light sensor. The light sensor includes at least one light sensor submodule, where each light sensor submodule includes a first light detector, a second light detector, a first linear polarizer, a second linear polarizer, a first phase delay film, and a second phase delay film, where the first light detector and the second light detector are disposed adjacently to each other; the first linear polarizer is located above the first light detector; the second linear polarizer is located above the second light detector; the first phase delay film is located above the first linear polarizer; the second phase delay film is located above the second linear polarizer; the first light detector is configured to obtain light intensity of first hybrid light resulting when hybrid light has passed through the first phase delay film and the first linear polarizer, and the second light detector is configured to obtain light intensity of second hybrid light resulting when the hybrid light has passed through the second phase delay film and the second linear polarizer; a fast axis direction of the first phase delay film is orthogonal to a fast axis direction of the second phase delay film, or a slow axis direction of the first phase delay film is orthogonal to a slow axis direction of the second phase delay film; and a polarization direction of the first linear polarizer is the same as a polarization direction of first linearly polarized light resulting when the first light has passed through the first phase delay film, and a polarization direction of the first light is the same as a polarization direction of the second polarizer.

For implementations of the third aspect and the fourth aspect, refer to the implementations of the second aspect, and details are not described herein again.

According to a fifth aspect, this application provides a terminal device. The terminal device includes a display screen, and the display screen includes a phase delay film, a linear polarizer, and a transparent cover. The terminal device further includes the light sensor provided in the foregoing aspects and implementations, where the hybrid light is a mixture of the first light resulting when ambient light has passed through the display screen and the second light formed by light emitted by the display screen itself. The light sensor outputs light intensity of the ambient light to the terminal device for adjustment of brightness of the display screen. The light sensor outputs the light intensity of the ambient light to the terminal device for adjustment of brightness of the display screen, so as to ensure sensing accuracy and enable the display screen to correctly adjust intensity of display light. By using the light sensor, the terminal device can accurately detect the light intensity of the external ambient light, avoiding influence of light emitted by the terminal device itself on a detection result.

The light sensor further includes a processor, and the processor is configured to: obtain total intensity of the first light and the second light that is detected by the first light detector, and light intensity, detected by the second light detector, of the second light, and output a difference between the light intensity detected by the first light detector and the light intensity detected by the second light detector. Calculation of a light sensing value is implemented by using the processor, so as to obtain the light intensity to be detected.

The terminal device includes a circuit board, and the processor is disposed on the circuit board, or the processor is disposed inside the light sensor without a specific position limited provided that a design fits an actual requirement.

According to a sixth aspect, this application provides a terminal device, including a processor and the light sensor provided in the foregoing aspects and implementations, where the processor is configured to process the light intensity of the first hybrid light and the light intensity of the second hybrid light.

In an implementation, when processing the light intensity of the first hybrid light and the light intensity of the second hybrid light, the processor is specifically configured to subtract the light intensity of the second hybrid light from the light intensity of the first hybrid light, to obtain light intensity of light resulting when the first light has passed through the first phase delay film and the first linear polarizer.

The processor may be a CPU that fetches an instruction stored in a memory to perform the corresponding processing function.

The light sensor in this application first converts ambient light and interference light, which are two types of light that have different polarization properties, into a same type of polarized light, and then generates and obtains a light intensity difference by using the first light detector and the second light detector. This light intensity difference is desired intensity of light that is converted from the ambient light. In this way, the light sensor can be prevented from obtaining and outputting intensity of light other than the natural ambient light, so as to avoid interference that causes an inaccurate detection result.

BRIEF DESCRIPTION OF THE DRAWINGS

To describe technical solutions in the embodiments of this application or in the background more clearly, the following briefly describes the accompanying drawings required for describing the embodiments of this application or the background.

DETAILED DESCRIPTION OF ILLUSTRATIVE EMBODIMENTS

Figure 1:
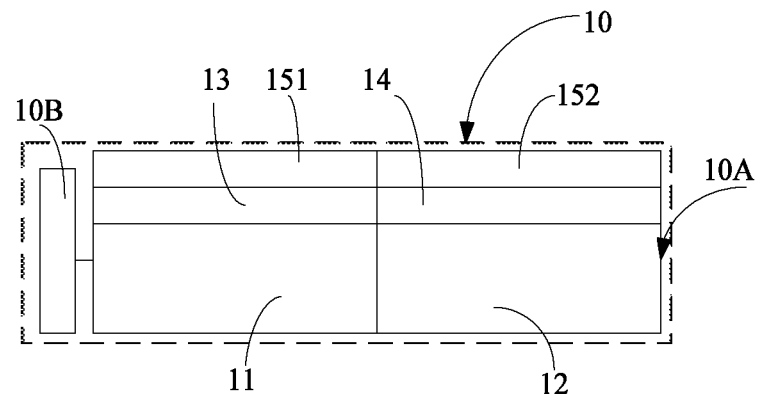
FIG. 1 is a schematic diagram of a side of an embodiment of a light sensor according to this application.

The following describes the embodiments of this application with reference to the accompanying drawings in the embodiments of this application.

To better describe this application, the following first explains terms used in this application.

Unpolarized light: Light waves are transverse waves, meaning that vibration directions of light wave vectors are perpendicular to a propagation direction of light. Generally, for a light wave emitted by a light source, vibration of its light wave vectors orientates irregularly in directions perpendicular to a light propagation direction, but according to statistical averages, in all possible directions in space, distribution of light wave vectors can be considered as equal-opportunity. A sum of these light wave vectors has symmetry around the light propagation direction. To be specific, the light vectors are characterized by axial symmetry, uniform distribution, and equal vibration amplitudes in all directions. This is natural light, also referred to as unpolarized light.

Linearly polarized light: A plane formed by a direction of vibration and a direction of forward motion of a light wave is referred to as a vibration plane. Light whose vibration plane is limited to a given fixed direction is referred to as linearly polarized light.

Circularly polarized light: A track of an end point of a light vector is a circle, meaning that the light vector is constantly rotating with a constant magnitude but its direction changes regularly with time.

Linear polarizer: also referred to as linear polarizing film, or linear light-polarizing film. A linear polarizing film can screen (which may also be understood as "filter out" or "block") incident light or let incident light pass through. The film may let one of longitudinal light and transverse light pass through and screen (filter out or block) the other. For natural light entering a linear polarizing film, only polarized light in one direction can pass through this component, and then linearly polarized light is obtained.

Circular light-polarizing film: A circularly light-polarizing film includes a linear polarizing film and a λ/4 phase delay film. In addition, a polarization direction of the linear polarizing film and O light (or E light) of the λ/4 phase delay film form an angle of 45 degrees.

Phase delay film: also referred to as a phase delay diaphragm, a phase delay sheet, or a wave plate. A phase delay film is made of a material with birefringence and can adjust a polarization state of a light beam. A wave plate has two optical axes (a fast axis and a slow axis) that are perpendicular to each other. When light passes through the wave plate, light travels faster in a given direction, and this direction is referred to as the fast axis. In a corresponding vertical direction, light travels more slowly, and this direction is referred to as the slow axis.

When a polarization direction of incident light and a direction of the fast axis form an angle of 45 degrees, light entering the wave plate decomposes into two beams of light with a same intensity and a same phase but perpendicular polarization directions. One beam of light is parallel to the fast axis, and the other beam of light is parallel to the slow axis. Because transmission speeds of light along the fast axis and light along the slow axis are different, when the two beams of light pass through the wave plate, a phase difference is generated. After passing through the wave plate, the two beams of light form a new beam of light. However, as the two beams of light have different phases, the new beam of light also have different polarization states. If the phase difference is 180°, this wave plate is a ½ wave plate or a half wave plate. A polarization direction of emergent light that passes through the ½ wave plate is perpendicular to a polarization direction of the incident light.

In addition, when the phase difference is 90 degrees, this wave plate is a quarter-wave plate, and emergent light that passes through the quarter-wave plate turns into circularly polarized light. Circularly polarized light does not have a polarization direction. If fast axes of two quarter-wave plates are parallel to each other, the two quarter-wave plates can form a ½ wave plate. Therefore, it can be known that circularly polarized light passing through one more quarter-wave plate is converted into linearly polarized light.

FIG. 1 shows a light sensor 10 according to an embodiment of this application. The light sensor may be in a form of a chip in terms of hardware. This chip may be directly installed behind a display screen of an electronic device, rather than be placed below a dedicated opening reserved outside a display region of the display screen. Therefore, this embodiment is applicable to full-display intelligent electronic devices (whose front display screen has nearly a 100% display region).

In this embodiment, the light sensor 10 receives light resulting when ambient light has passed through the display screen and light emitted by the display screen itself. It should be explained that the received ambient light may have a relatively large loss when passing through the display screen because display screens are generally not transparent. Later, when the light passes through various optical components (for example, a phase delay film and a linear polarizer) before reaching the light detector, there is also a loss, but this loss is quite small and almost ignorable. For light that is lost when passing through the display screen, calibration can be performed later through compensation using a processor, so that light intensity finally obtained is consistent with initial light intensity. The final light intensity so obtained is a standardized light intensity and is applicable to more applications based on standardized light intensities. In another embodiment, for a particular application, calibration may alternatively not be performed, provided that a correspondence between light intensity after loss and the particular application is established. Processing may be performed later based on this correspondence. For example, a correspondence is established between screen brightness and final uncalibrated light intensity directly detected by a light detector, so that the screen is adjusted to specific brightness under given light intensity.

Specifically, the light sensor 10 includes at least one light sensor submodule 10A, where each light sensor submodule 10A includes a first light detector 11, a second light detector 12, a first linear polarizer 13, a second linear polarizer 14, a first phase delay film 151, and a second phase delay film 152. The first light detector 11 and the second light detector 12 are disposed adjacently to each other. The first linear polarizer 13 is located above the first light detector 11, and the second linear polarizer 14 is located above the second light detector 12. The first phase delay film 151 is disposed above the first linear polarizer 13, and the second phase delay film 152 is disposed above the second linear polarizer 14.

The first light detector 11 is configured to obtain light intensity of first hybrid light resulting when hybrid light has passed through the first phase delay film 151 and the first linear polarizer 13. The hybrid light includes first light A and second light B. The second light detector 12 is configured to obtain light intensity of second hybrid light resulting when the hybrid light has passed through the second phase delay film 152 and the second linear polarizer 14. After the hybrid light passes through the second linear polarizer 14, the first light A is filtered out. Therefore, a difference between the light intensity of the first hybrid light and the light intensity of the second hybrid light is light intensity of the first light A that has passed through the first phase delay film 151 and the first linear polarizer 13. A polarization direction of the first linear polarizer 13 is the same as a polarization direction of the first light A that has not passed through the first linear polarizer 13, and a polarization direction of the first light is orthogonal to a polarization direction of the second polarizer 14.

The following description uses a light sensor submodule 10A as an example. Specifics are as follows.

The first light detector 11 and the second light detector 12 may be located in a chip and is at the end of a receive light path. The receive light path is a light path for receiving light, which is a light path along which light passes through, from top down, the display screen, the first phase delay film 151, the first linear polarizer 13, and the first light detector 11 in turn (or a light path along which light passes through, from top down, the second phase delay film 152, the second linear polarizer 14, and the second light detector 12 in turn). The first linear polarizer 13 is stacked above the first light detector 11 in the receive light path of the first light detector 11. The first linear polarizer 13 and the second linear polarizer 14 are located at one level, that is, in one horizontal plane. A vertical height difference is allowed between the first linear polarizer 13 and the second linear polarizer 14, though. For the sake of stability, in a horizontal direction, the first light detector 11 and the second light detector 12 may be interconnected; and in a vertical direction, the first light detector 11 and the second light detector 12 are of a same height or some error is allowed. In the horizontal direction, they are disposed separately, with or without a clearance. Light intensity of the second light B obtained by the first light detector 11 is the same as light intensity of the second light B obtained by the second light detector 12. A difference is generated between the light intensity obtained by the first light detector 11 and the light intensity obtained by the second light detector 12. This intensity difference is light intensity to be detected. In this embodiment of this application, the first phase delay film 151 and the second phase delay film 152 are formed in one piece, that is, a one-piece structure. Certainly, the first phase delay film 151 and the second phase delay film 152 may be two separate pieces that are stacked above the first linear polarizer 13 and the second linear polarizer 14 respectively.

In this embodiment, the first phase delay film 151 and the second phase delay film 152 are $\lambda/4$ phase delay films (or referred to as quarter-wave plates). Fast axes of the two phase delay films are of a same direction. Therefore, after circularly polarized light that has passed through the display screen passes through the two films, two resulting beams of linearly polarized light (A1 and A2) have a same polarization direction.

Figure 2A:
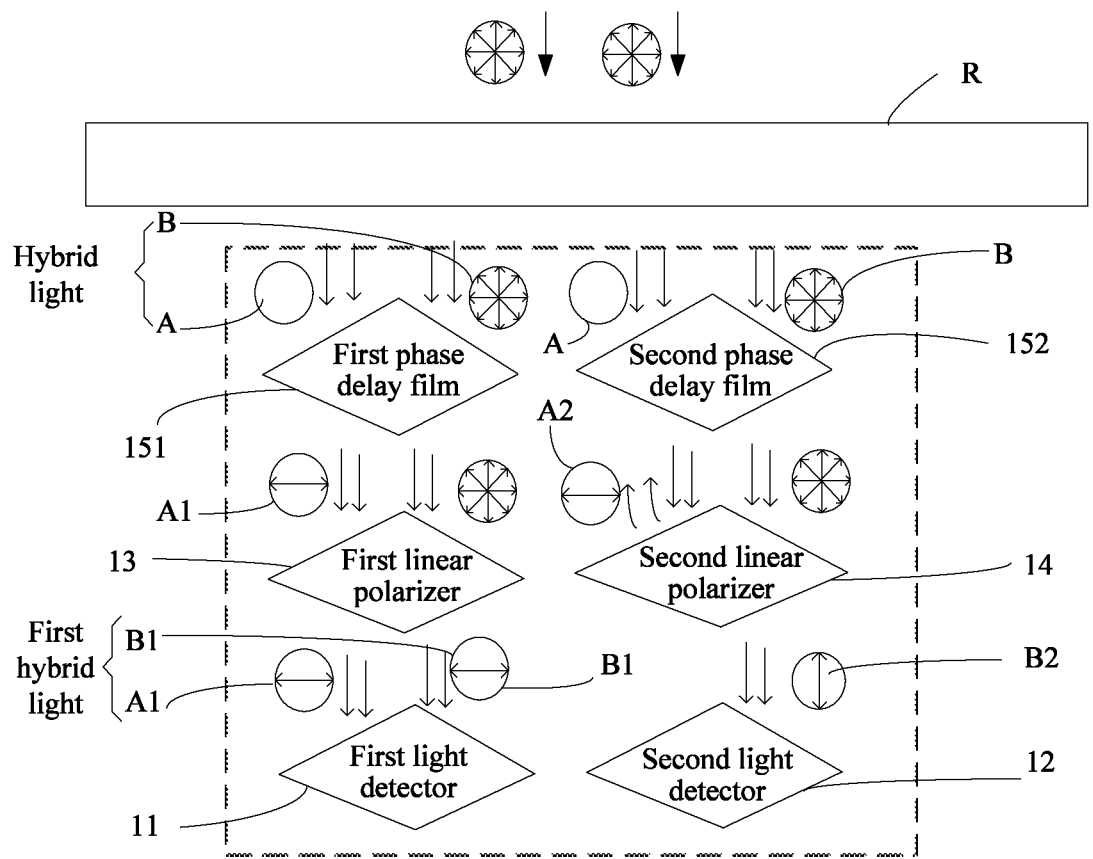
FIG. 2A is a schematic diagram of light conversion and light flowing of the light sensor shown in FIG. 1.

FIG. 2A is a diagram of light conversion and light flowing in this embodiment. This embodiment uses an example in which a light sensor is used to detect light intensity given by ambient light to a display screen. Ambient light that is unpolarized passes through a display screen R and forms hybrid light with lamplight (unpolarized light) inside the display screen. The hybrid light is light that has passed through the display screen but has not entered a light detector. A linear polarizer and a phase delay film (also a $\lambda/4$ phase delay film) are disposed in the display screen. A combination of the linear polarizer and the $\lambda/4$ phase delay film is equivalent to a circular polarizer. After the ambient light that is unpolarized passes through the display screen (through the linear polarizer and the phase delay film in the display screen), the ambient light is converted into circularly polarized light (A). Therefore, the hybrid light includes light that is circularly polarized, the first light A, and light that is unpolarized (lamplight), the second light B. Hybrid light captured by the first light detector 11 and hybrid light captured by the second light detector 12 are one beam of light of one brightness and one polarization property.

In this embodiment, the first light A that is circularly polarized passes through the first phase delay film 151, and turns into first linearly polarized light A1 that has the same polarization direction as the first linear polarizer 13. The first linearly polarized light A1 passes through the first linear polarizer 13 completely without its polarization property changed, and is captured by the first light detector 11. The first light A also passes through the second phase delay film 152 and turns into second linearly polarized light A2 whose polarization direction is orthogonal to the polarization direction of the second linear polarizer 14. Because the polarization direction of the linearly polarized light is orthogonal to the polarization direction of the second linear polarizer 14, the second linearly polarized light A2 is filtered out (or screened or blocked, so that the second linearly polarized light A2 cannot pass through the second linear polarizer 14) when passing through the second linear polarizer 14. The first polarized light A1 and the second linearly polarized light A2 are light resulting when the first light A has changed the polarization direction, and intensity of the light is the same as intensity of the first light A entering the light sensor. The intensity of light after the conversion has remained the same as that before the conversion. The second light B is unpolarized light that is generated by light emitted by the display screen itself (for example, light emitted by a backlight or light emitted by a self-luminous pixel). The second light B passes through the first delay film 151 without any polarization conversion. Then the second light B passes through the first linear polarizer 13 to become third linearly polarized light B1, which is captured by the first light detector 11. The second light B passes through the second phase delay film 152 and then passes through the second polarizer 14 to become fourth linearly polarized light B2, which is captured by the second light detector 12. The first hybrid light includes the first linearly polarized light A1 and the third linearly polarized light B1, and the second hybrid light includes the fourth linearly polarized light B2. Light intensity of the third linearly polarized light B1 is the same as light intensity of the fourth linearly polarized light B2. Actually, the third linearly polarized light B1 and the fourth linearly polarized light B2 are light resulting when the same beam of second light has changed its polarization direction, and their light intensity is the same as that of the second light. The intensity of light after the conversion has remained the same as that before the conversion. Therefore, a difference between the intensity of the first hybrid light and the intensity of the second hybrid light is light intensity of the first linearly polarized light A1 resulting when the hybrid light has passed through the first phase delay film 151 and the first linear polarizer 13.

The second light detector 12 is used to obtain light intensity of the fourth linearly polarized light B2 resulting when unpolarized light has passed through the second linear polarizer 14, without capturing the second linearly polarized light A2 resulting from the conversion of the first light A. This is because the polarization direction of the second linearly polarized light A2 is orthogonal to the polarization direction of the second linear polarizer 14. Moreover, the first linearly polarized light A1 and the second linearly polarized light A2 have the same polarization property. In other words, the polarization direction of the first linear polarizer 13 is orthogonal to the polarization direction of the second linear polarizer 14.

The light sensor in this application is used to detect the light intensity of the external natural ambient light. The ambient light and interference light, which are two types of light that have different properties, are converted into the first hybrid light and the second hybrid light. The first hybrid light is captured by the first light detector 11, and the second hybrid light is captured by the second light detector 12, so that a difference is generated between the light intensity obtained by the first light detector 11 and the light intensity obtained by the second light detector 12, and then processing is performed to extract the intensity difference, that is, the light intensity of the first light A converted from the ambient light. In this way, the light sensor can be prevented from obtaining and outputting intensity of light other than the natural ambient light, so as to avoid interference that causes an inaccurate detection result.

Figure 2B:
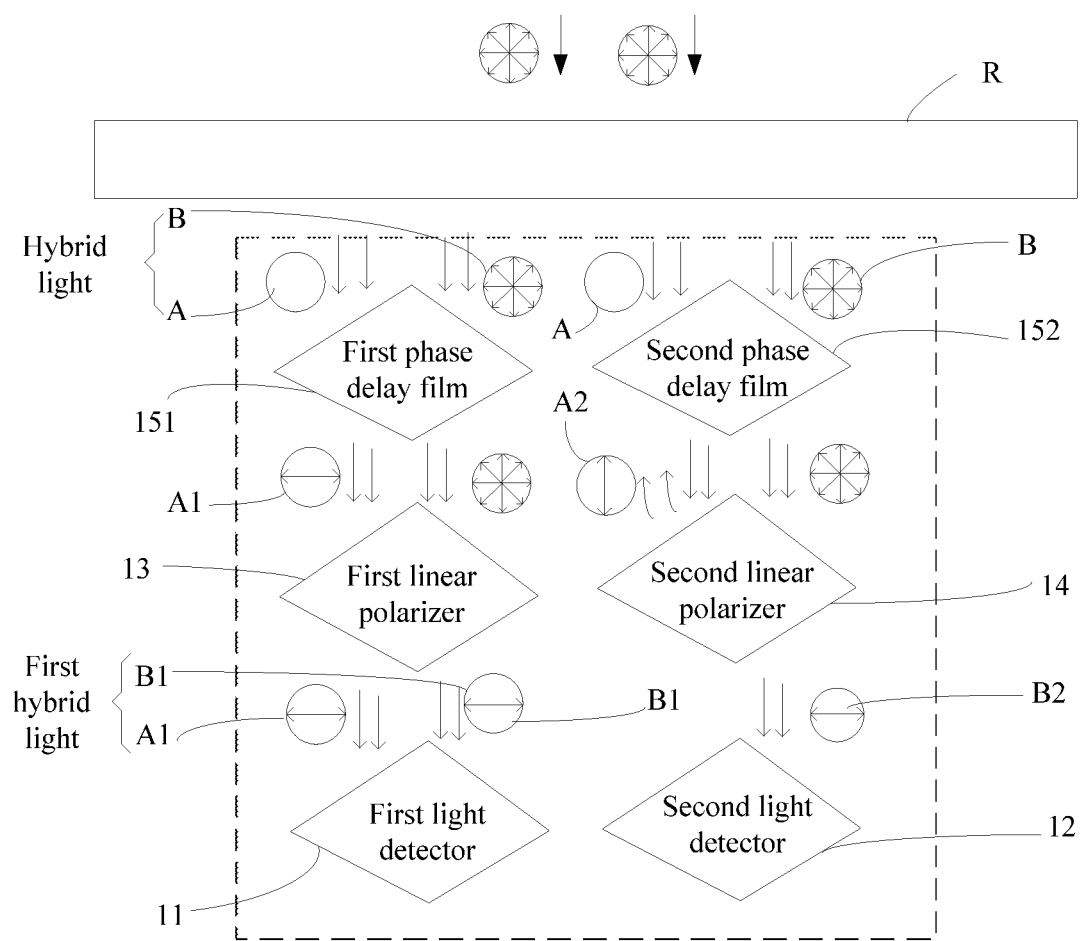
FIG. 2B is a schematic diagram of light conversion and light flowing of another embodiment of a light sensor.

Refer to FIG. 2B. In another embodiment, fast axis directions of the two phase delay films (151 and 152) may be orthogonal (perpendicular) to each other. In this way, after the first light A (circularly polarized light) passes through the two phase delay films (151 and 152), the polarization directions of the two resulting beams of linearly polarized light (A1 and A2) are orthogonal to each other.

Accordingly, the two linear polarizers (13 and 14) are disposed with a same polarization direction that is orthogonal to a direction of one beam of polarized light. In this way, the one beam of polarized light can be filtered out. For example, as shown in FIG. 2B, the polarization directions of the two linear polarizers (13 and 14) are the same as the direction of the first polarized light A1. In this case, as the polarization direction of the second linearly polarized light A2 is orthogonal to the polarization direction of A1, A2 is filtered out by the second linear polarizer 14. For other optical paths and corresponding processing, reference may be made to the descriptions for FIG. 2A, and no more description is given herein.

As shown in FIG. 1, the light sensor further includes a processor 10B, and the processor 10B is configured to: obtain total intensity of the first light A and the second light B that is detected by the first light detector 11, and light intensity of the second light B detected by the second light detector 12, and output a difference between the light intensity detected by the first light detector 11 and the light intensity detected by the second light detector 12. This difference is a light intensity signal of the first light A, that is, light intensity of the first linearly polarized light A1 resulting from the conversion. The processor 10B may be integrated inside a light sensor and located on one side or at the bottom of the first light detector 11 and the second light detector 12, or may be carried on a circuit board and connected to the first light sensor 11 and the second light sensor 12. The processor 10B includes a reading module, a computing module, and an output module. The reading module reads the light intensity values detected by the first light detector 11 and the second light detector 12, and provides the light intensity values to the computing module, for the computing module to compute a light intensity difference, and then the output module outputs the difference.

Figure 8:
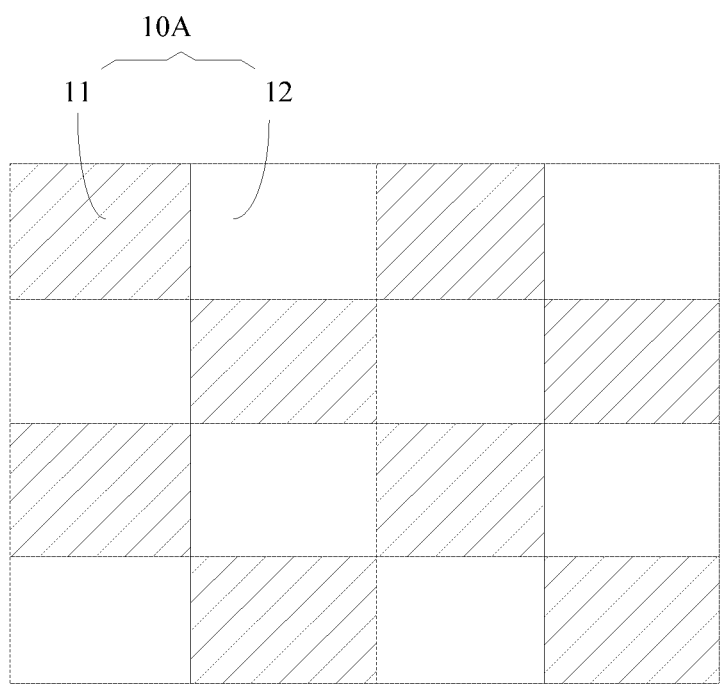
FIG. 8 is a schematic diagram of a matrix array formed by a plurality of light sensor submodules.

As shown in FIG. 8, there are a plurality of light sensor submodules that are arranged in a form of a matrix, and in the matrix formed by the plurality of light sensor submodules, first light detectors 11 and second light detectors 12 are arranged in a staggered manner. The plurality of light sensor submodules may be either interconnected or not interconnected. As shown in this figure, one second light detector 12 is disposed on one side of each first light detector 11, and there are no two consecutive first light detectors 11 or second light detectors 12 in a row or in a column. A plurality of first light detectors 11 and a plurality of second light detectors 12 are arranged in a form of a matrix. Certainly, this application is not limited to the arrangement in this embodiment, provided that ambient light can be detected evenly. Light intensity sensed by the light sensor is a sum of light intensity values of the first light A that are detected by the plurality of light sensor submodules, where the first light A is the ambient light.

Figure 3:
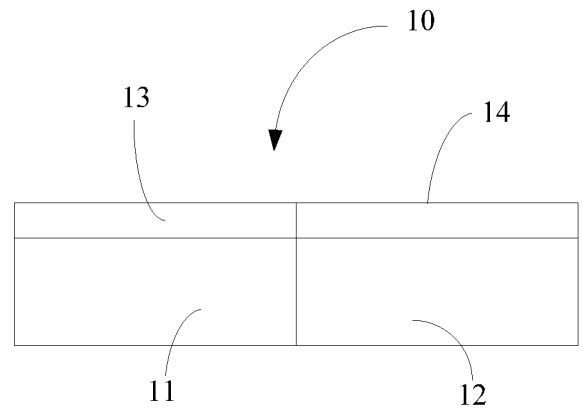
FIG. 3 is a schematic diagram of another embodiment of a light sensor according to this application.
Figure 4:
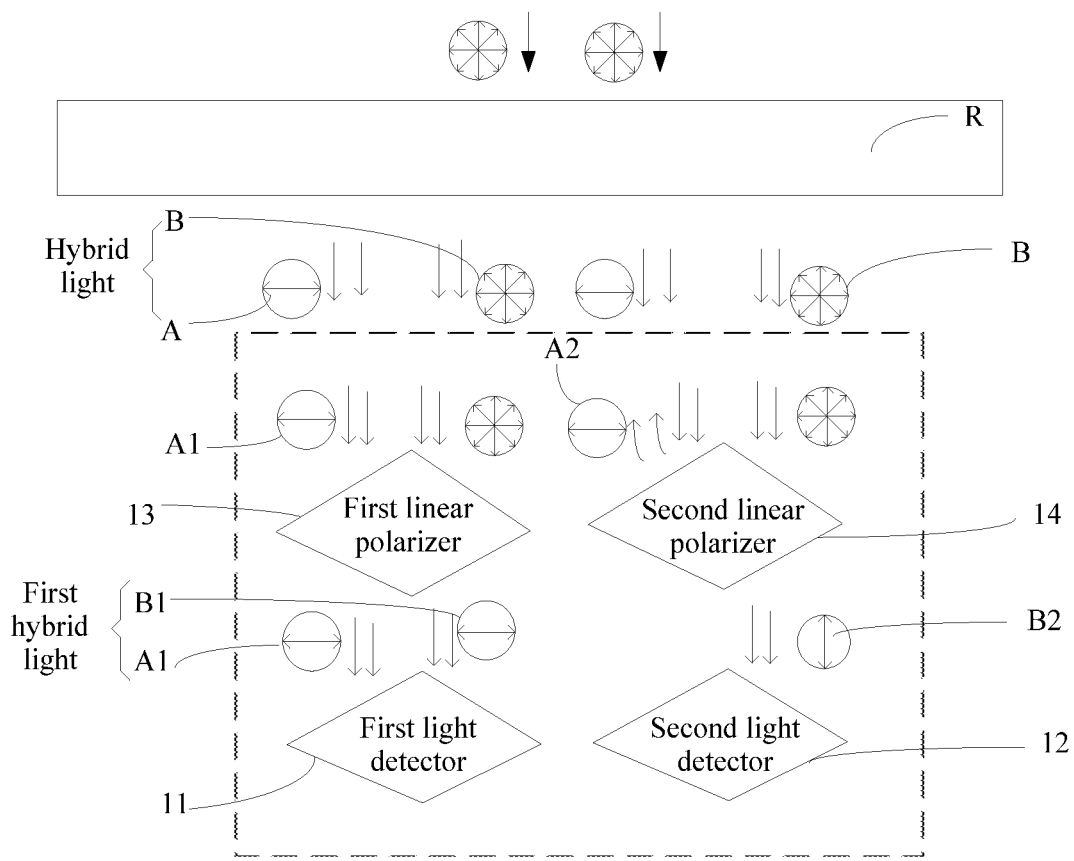
FIG. 4 is a schematic diagram of light conversion and light flowing of the light sensor shown in FIG. 3.

Refer to FIG. 3 and FIG. 4. In another embodiment of this application, the first light A in the hybrid light is linearly polarized light. The first light A may result after unpolarized light passes through a luminophor, for example, a luminophor disposed with a polarizer. In this embodiment, unpolarized light is natural ambient light, for example, sunlight. The second light B is unpolarized light, for example, lamplight or unpolarized light in a non-natural environment. In this embodiment, the first phase delay film 151 and the second phase delay film 152 are not required. After passing through the first linear polarizer 13 or the second linear polarizer 14, the second light B is converted to linearly polarized light. In addition, after passing through the first linear polarizer 13, the second light B remains linearly polarized, and a polarization direction of the second light B that has passed through the second linear polarizer 14 is orthogonal to a polarization direction of the second light B that has passed through the first linear polarizer 13. The first light detector 11 obtains light intensity of the first polarized light resulting when the first light A has passed through the first linear polarizer 13 and the third polarized light resulting when the second light B has passed through the first linear polarizer 13. The first light A is filtered out when passing through the second linear polarizer 14. The second light detector 12 obtains only light intensity of the second polarized light resulting when the second light B has passed through the second linear polarizer 14. A difference is generated between the light intensity obtained by the first light detector 11 and the light intensity obtained by the second light detector 12. The output light intensity is intensity of the first light A1 that has passed through the first linear polarizer 13.

Figure 5:
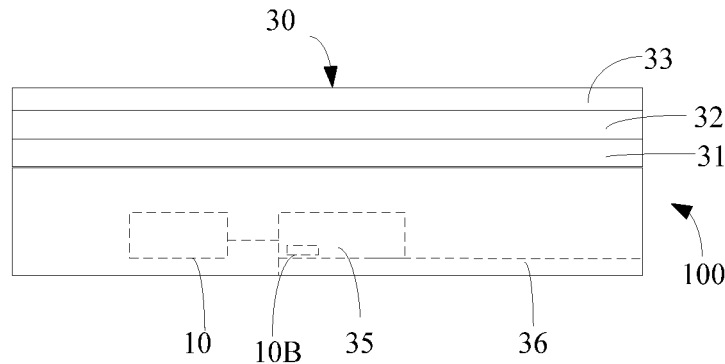
FIG. 5 is a schematic diagram of a terminal device according to this application.

Refer to FIG. 5. This application relates to a terminal device 100, where the terminal device is a mobile phone, a tablet computer, or a wearable device disposed with a screen. In this embodiment, a mobile phone is used as an example. The mobile phone includes a display screen 30, a processor 35 (for example, a Qualcomm Snapdragon CPU chip or a HiSilicon Kirin processor), and a light sensor 10 that is disposed behind the display screen 30. The display screen 30 includes a phase delay film 31, a linear polarizer 32, and a transparent cover 33 that are stacked in this order. After passing through the transparent cover 33, the linear polarizer 32, the phase delay film 31, and the display screen 30, ambient light is converted to first light A. Light emitted by the display screen 30 itself is second light B. The first light A and the second light B are hybrid light and are detected by light detectors. A processor 10B of the light sensor is configured to: obtain total intensity of the first light and the second light that is detected by a first light detector 11, and light intensity, detected by a second light detector 12, of the second light, and output a difference between the light intensity detected by the first light detector and light intensity detected by the second light detector. The light sensor outputs light intensity of the ambient light to the terminal device for adjustment of brightness of the display screen.

The terminal device further includes a circuit board 36. The processor 35 is disposed on the circuit board 36. When the sensor 10 is packaged as a chip, the sensor chip may be disposed with no processor, while its processing function can be implemented by the processor 35. In other words, it may be considered that the processor 35 of the mobile phone logically has a function module 10B to process data of the light sensor (for example, to obtain light intensity values and to perform calibration). Specifically, the processor 35 may implement the function of the function module 10B by using a dedicated hardware circuit (for example, an FPGA or an ASIC), or implement the function of the function module 10B by using software based on a general-purpose CPU core.

Figure 7:
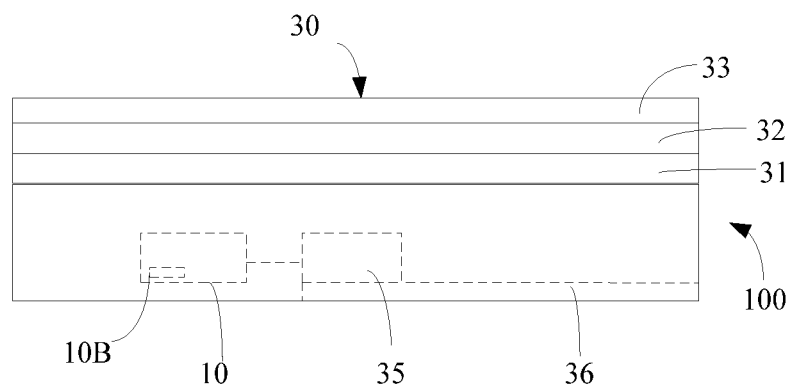
FIG. 7 is a schematic diagram of an implementation of disposing a processor of the terminal device shown in FIG. 5 inside a light sensor.

In another embodiment, as shown in FIG. 7, the function module 10B may be disposed inside the sensor chip. To be specific, the processing function module 10B is packaged together with other components of the sensor, and directly outputs a processing result to the processor 35 of the terminal.

In this embodiment, the display screen is an OLED display (or other types of displays in other embodiments, for example, an LED display screen). The phase delay film 31 is a same type of phase delay film as the foregoing first phase delay film 151 and the second phase delay film 152. In this embodiment, the phase delay film 31 and the phase delay films 151 and 152 are all λ/4 phase delay films.

Figure 6:
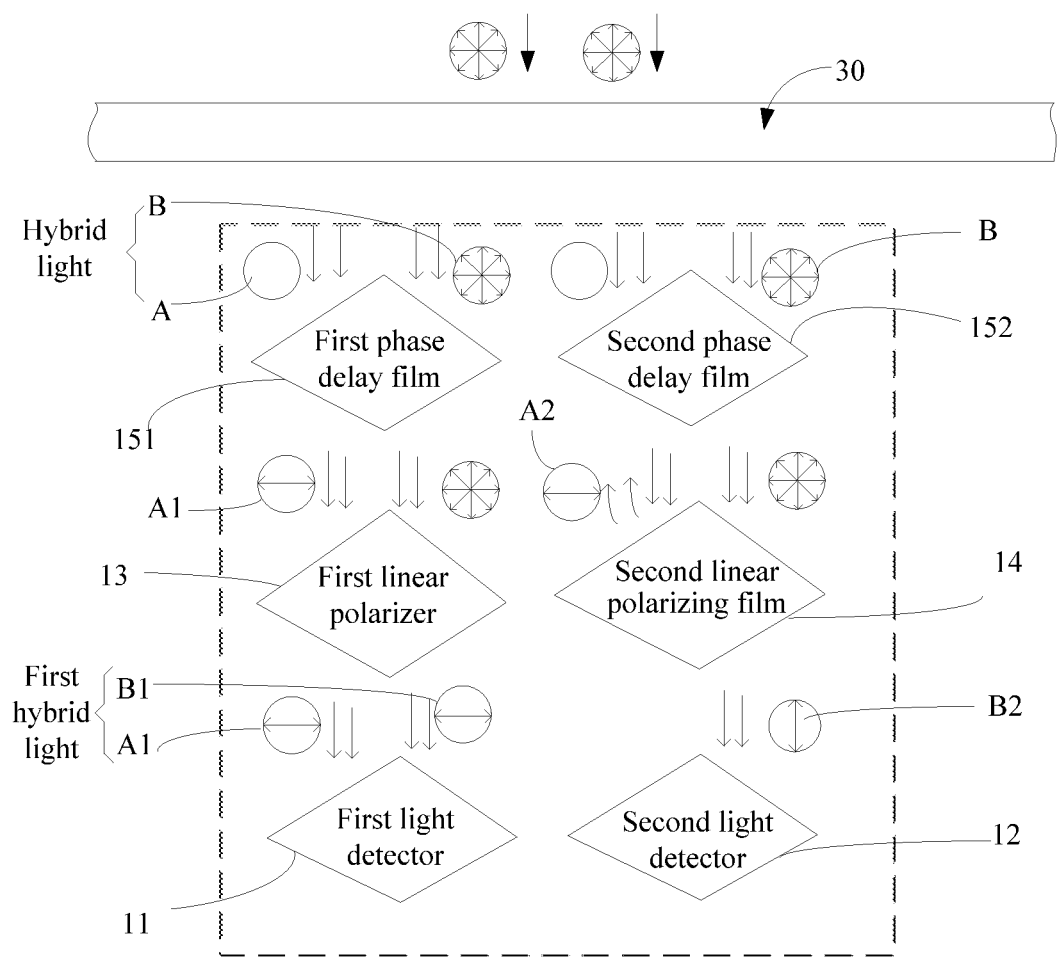
FIG. 6 is a schematic diagram of light conversion and light flowing of the terminal device shown in FIG. 5.

Refer to FIG. 6. When brightness of a mobile phone screen needs to be adjusted, a light sensor detects whether light is sufficient in a use environment. When passing through a display screen 30, ambient light is converted from unpolarized light into circularly polarized light. The circularly polarized light and LED lamplight of the display screen form hybrid light. The hybrid light enters the light sensor and passes through a first phase delay film 151 and a second phase delay film 152, and a first linear polarizer 13 and a second linear polarizer 14 to become converted. Finally, the converted light is captured by the first light detector 11 and the second light detector 12, and a light intensity difference is generated. This light intensity difference is exactly light intensity of the ambient light. Then, a processor performs processing to obtain the light intensity difference and outputs it to a circuit board. Influence of the lamplight is excluded. Calibration is performed based on overall transmittance of the OLED display to accomplish proper adjustment of screen brightness. The light sensor used can promote experience of adaptive screen brightness adjustment for a mobile phone or a wearable device based on ambient light.

A person of ordinary skill in the art may understand that all or some of the processes (for example, calibrating data, and performing, based on the calibrated data, a specific application operation, for example, light intensity adjustment) of the method in the foregoing embodiments may be implemented by a computer program instructing relevant hardware. The program may be stored in a computer readable storage medium. When the program is executed, the processes of the foregoing method embodiments are performed. The foregoing storage medium may include: a magnetic disk, an optical disc, a read-only memory (ROM), or a random access memory (RAM).

In the foregoing examples of embodiments, the objective, technical solutions, and advantage of this application are further described in detail. The foregoing descriptions are merely examples of embodiments of this application, but are not intended to limit this application. Any modification, equivalent replacement, or improvement made without departing from the spirit and principle of this application shall fall within the protection scope of this application.

What is claimed is:

1. A light sensor, comprising a light sensor submodule, wherein the light sensor submodule comprises a first light detector, a second light detector, a first linear polarizer, a second linear polarizer, a first phase delay film, and a second phase delay film, and wherein:
   the first light detector and the second light detector are disposed adjacently to each other;
   the first linear polarizer is above the first light detector;
   the second linear polarizer is above the second light detector;
   the first phase delay film is above the first linear polarizer;
   the second phase delay film is above the second linear polarizer; and
   the first light detector is configured to obtain light intensity of first hybrid light resulting from third hybrid light passing through the first phase delay film and the first linear polarizer, and the second light detector is configured to obtain light intensity of second hybrid light resulting from the third hybrid light passing through the second phase delay film and the second linear polarizer, wherein the third hybrid light comprises first light and second light, and after the third hybrid light passes through the second linear polarizer, the first light is filtered out.

2. The light sensor according to claim 1, wherein:
a fast axis direction of the first phase delay film is the same as a fast axis direction of the second phase delay film, or a slow axis direction of the first phase delay film is the same as a slow axis direction of the second phase delay film; and
a polarization direction of the first linear polarizer is the same as a polarization direction of first linearly polarized light resulting from the first light passing through the first phase delay film, and a polarization direction of the first light is orthogonal to a polarization direction of the second linear polarizer.

3. The light sensor according to claim 1, wherein:
a fast axis direction of the first phase delay film is orthogonal to a fast axis direction of the second phase delay film, or a slow axis direction of the first phase delay film is orthogonal to a slow axis direction of the second phase delay film; and
a polarization direction of the first linear polarizer is the same as a polarization direction of first linearly polarized light resulting from the first light passing through the first phase delay film, and a polarization direction of the first light is the same as a polarization direction of the second linear polarizer.

4. The light sensor according to claim 1, wherein:
the first light is circularly polarized light resulting from ambient light passing through a display screen disposed with a circular polarizer; and
the second light is emitted by a light emitting component of the display screen.

5. The light sensor according to claim 1, wherein the first phase delay film and the second phase delay film are one piece.

6. The light sensor according to claim 1, wherein the first phase delay film and the second phase delay film are separate pieces.

7. The light sensor according to claim 1, wherein each of the first phase delay film and the second phase delay film comprise a respective quarter-wave plate.

8. The light sensor according to claim 1, wherein the light sensor comprises a plurality of light sensor submodules arranged in a form of a matrix, each light sensor module of the plurality of light sensor submodules comprises a respective first light detector and a respective second light detector, and in the matrix formed by the plurality of light sensor submodules, first light detectors and second light detectors are arranged in a staggered manner.

9. The light sensor according to claim 1, further comprising:
a processor, configured to:
obtain a total intensity of the first light and the second light detected by the first light detector;
obtain a light intensity detected by the second light detector of the second light; and
output a difference between the total intensity detected by the first light detector and the light intensity detected by the second light detector.

10. The light sensor according to claim 9, wherein:
the processor is disposed on one side of the first light detector;
the processor is disposed at the bottom of the first light detector;
the processor is disposed on one side of the second light detector;
the processor is disposed at the bottom of the second light detector; or
the processor is connected to the light sensor through a circuit board.

11. A terminal device, comprising:
a light sensor, comprising: a light sensor submodule, wherein the light sensor submodule comprises a first light detector, a second light detector, a first linear polarizer, a second linear polarizer, a first phase delay film, and a second phase delay film;
a display screen; and
a processor; and
wherein:
the first light detector and the second light detector are disposed adjacently to each other;
the first linear polarizer is above the first light detector;
the second linear polarizer is above the second light detector;
the first phase delay film is above the first linear polarizer;
the second phase delay film is above the second linear polarizer;
the first light detector is configured to obtain a light intensity of first hybrid light resulting from third hybrid light passing through the first phase delay film and the first linear polarizer, and the second light detector is configured to obtain a light intensity of second hybrid light resulting from the third hybrid light passing through the second phase delay film and the second linear polarizer, wherein the third hybrid light comprises first light and second light, and after the third hybrid light passes through the second linear polarizer, the first light is filtered out;
the first light results from ambient light passing through the display screen, the second light comprises light emitted by the display screen, and the third hybrid light is a first combination of the first light and the second light;
the light sensor is configured to output a light intensity of the ambient light to the terminal device, causing the terminal device to adjust a brightness of the display screen; and
the processor is configured to process the light intensity of the first hybrid light and the light intensity of the second hybrid light.

12. The terminal device according to claim 11, wherein:
a fast axis direction of the first phase delay film is the same as a fast axis direction of the second phase delay film, or a slow axis direction of the first phase delay film is the same as a slow axis direction of the second phase delay film; and
a polarization direction of the first linear polarizer is the same as a polarization direction of first linearly polarized light resulting from the first light passing through the first phase delay film, and a polarization direction of the first light is orthogonal to a polarization direction of the second linear polarizer.

13. The terminal device according to claim 11, wherein:
a fast axis direction of the first phase delay film is orthogonal to a fast axis direction of the second phase delay film, or a slow axis direction of the first phase delay film is orthogonal to a slow axis direction of the second phase delay film; and
a polarization direction of the first linear polarizer is the same as a polarization direction of first linearly polarized light resulting from the first light passing through the first phase delay film, and a polarization direction of the first light is the same as a polarization direction of the second linear polarizer.

14. The terminal device according to claim 11, wherein:
the first light is circularly polarized light resulting from ambient light passing through the display screen disposed with a circular polarizer; and
the second light is emitted by a light emitting component of the display screen.

15. The terminal device according to claim 11, wherein the first phase delay film and the second phase delay film are one piece or separate pieces.

16. The terminal device according to claim 11, wherein each of the first phase delay film and the second phase delay film comprises a respective quarter-wave plate.

17. The terminal device according to claim 11, wherein the light sensor comprises a plurality of light sensor submodules arranged in a form of a matrix, each light sensor submodule of the plurality of light sensor submodules comprises a respective first light detector and a respective second light detector, and in the matrix formed by the plurality of light sensor submodules, first light detectors and second light detectors are arranged in a staggered manner.

18. The terminal device according to claim 11, wherein the light sensor further comprises another processor, and the another processor is configured to:
obtain a total intensity of the first light and the second light that is detected by the first light detector;
obtain a light intensity detected by the second light detector of the second light; and
output a difference between the total intensity detected by the first light detector and the light intensity detected by the second light detector.

19. The terminal device according to claim 18, wherein:
the another processor is disposed on one side of the first light detector;
the another processor is disposed at the bottom of the first light detector;
the another processor is disposed on one side of the second light detector;
the another processor is disposed at the bottom of the second light detector; or
the another processor is connected to the light sensor through a circuit board.

20. The terminal device according to claim 11, wherein the processor being configured to process the light intensity of the first hybrid light and the light intensity of the second hybrid light comprises the processor being configured to:
subtract the light intensity of the second hybrid light from the light intensity of the first hybrid light, to obtain light intensity of light resulting from the first light passing through the first phase delay film and the first linear polarizer.

* * * * *

UNITED STATES PATENT AND TRADEMARK OFFICE
CERTIFICATE OF CORRECTION

PATENT NO. : 10,782,185 B2
APPLICATION NO. : 16/797383
DATED : September 22, 2020
INVENTOR(S) : Hui Wang It is certified that error appears in the above-identified patent and that said Letters Patent is hereby corrected as shown below:

On the Title Page

Item (73) Assignee, Line 2, delete "(CM)" and insert --(CN)--.

Signed and Sealed this
Tenth Day of May, 2022

Katherine Kelly Vidal
*Director of the United States Patent and Trademark Office*